No. 729,687. PATENTED JUNE 2, 1903.
C. W. SMITH.
FISHING LINE ATTACHMENT.
APPLICATION FILED DEC. 16, 1902.
NO MODEL.
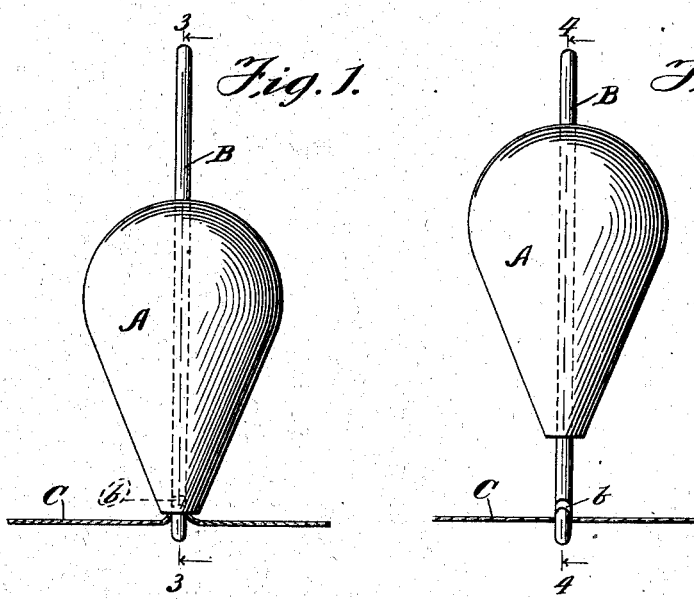
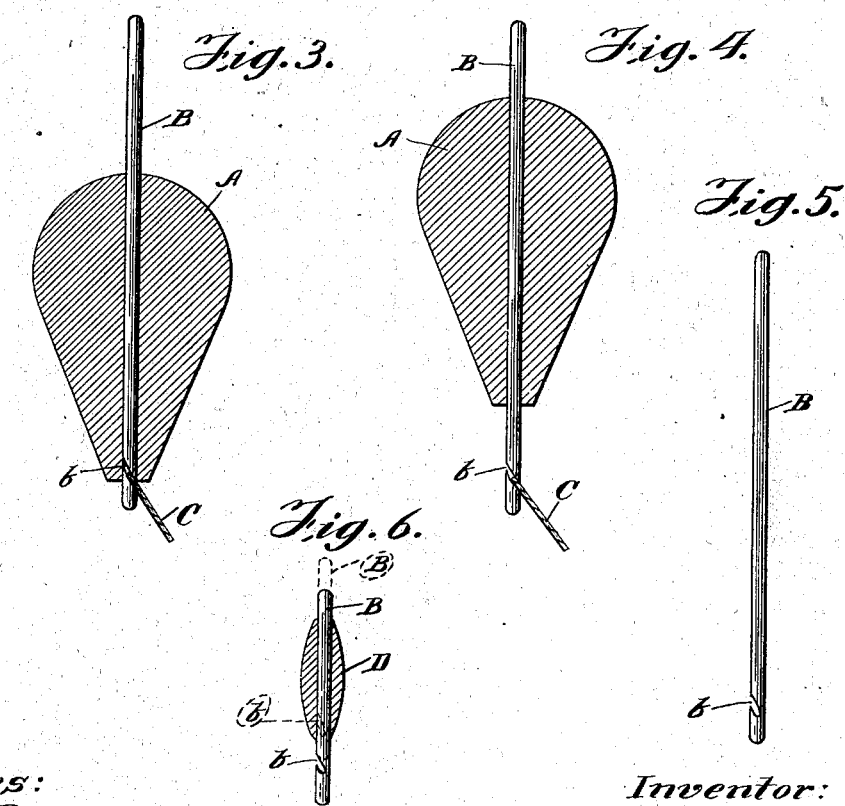

No. 729,687. Patented June 2, 1903.

UNITED STATES PATENT OFFICE.

CHARLES W. SMITH, OF CHICAGO, ILLINOIS.

FISHING-LINE ATTACHMENT.

SPECIFICATION forming part of Letters Patent No. 729,687, dated June 2, 1903.

Application filed December 16, 1902. Serial No. 135,394. (No model.)

*To all whom it may concern:*

Be it known that I, CHARLES W. SMITH, a citizen of the United States, residing at Chicago, in the county of Cook and State of Illinois, have invented certain new and useful Improvements in Fishing-Line Attachments, of which the following is a specification.

My invention relates more particularly to fishing-line attachments consisting of bobs or floats; but it may also be applied to sinkers.

Objects of my invention are to provide simple and convenient means whereby floats and sinkers can be readily attached to and detached from fishing-lines, and particularly to permit the user to readily shift a float along the line in accordance with well-known requirements.

In carrying out my invention I provide the float with a longitudinally-adjustable stem having a hook or notch adapted for engaging the line and arranged at one end portion of the stem, and where my invention is applied to a sinker I provide the latter with a similar adjustable stem. By adjusting the stem so as to project its end portion having the hook or notch out from the body of the float or sinker the line can be caught in the hook or notch, and by then reversely adjusting the stem the line thus engaged by the latter will be drawn into and wedged within the bore in which the stem is arranged for adjustment, and in this way the parts will be practically locked together.

In the accompanying drawings, Figure 1 shows in elevation a fishing-line float having the stem engaging the line and adjusted so as to temporarily fasten the float upon the line. Fig. 2 is a like view showing the stem adjusted into position to permit the line to be attached to or disconnected from the stem or to permit the float and its stem to be shifted along the line. Fig. 3 is a section through Fig. 1 on dotted line 3 3, the stem being shown in elevation. Fig. 4 is a like section through Fig. 2 on dotted line 4 4. Fig. 5 shows the stem detached from the float. Fig. 6 shows in section a fishing-line sinker with my improvement applied thereto, the adjustable stem being shown in elevation.

The float A may be of any desired form and of any suitable material. The stem B extends through an axial bore with which the float is provided and is fitted within said bore, so that while it will be held in engagement with the float under all ordinary conditions by frictional contact it can be adjusted longitudinally through the float, or, what is the same thing, the float by the application of suitably-directed power can be adjusted along the stem when the latter is held against end movement. One end portion of the stem is provided with a hook, which is preferably formed by making an oblique notch *b* in the stem. When this notched end portion of the stem is projected from the float, as in Figs. 2 and 4, the line C can be caught in the notch, as illustrated, and by then relatively adjusting the float and stem so as to retract the notch portion of the stem within the float, as in Figs. 1 and 3, a portion of the line will be drawn within the float and the parts of the line adjacent to the notch will be wedged between the stem and the float, and thereby the float will be securely held upon the line. When the float and stem are relatively adjusted, as in Figs. 2 and 4, so as to project the notched end portion of the stem from the float, the stem which carries the float can be slipped along the line from point to point, as may be desired.

In Fig. 6 the stem B, having a hook or notch *b*, is adjustably applied to a sinker D and adapted for engaging the line and for adjustment as hereinbefore described in connection with the float.

What I claim as my invention is—

1. The combination with a fishing-line of an attachment therefor provided with a longitudinally-adjustable stem having a hook or notch for engaging the fishing-line.

2. A float for fishing-lines having a longitudinally-adjustable stem provided with a hook-shaped portion for engaging the fishing-line.

3. A float for fishing-lines having a longitudinally-adjustable stem provided with an oblique notch forming a hook for engaging the fishing-line.

CHARLES W. SMITH.

Witnesses:
CHARLES G. PAGE,
OTTILIE C. SHEERING.